(12) United States Patent
Giura

(10) Patent No.: US 12,267,671 B2
(45) Date of Patent: Apr. 1, 2025

(54) PRIVACY PRESERVING LOCATION SERVICES

(71) Applicant: AT&T Intellectual Property I, L.P., Atlanta, GA (US)

(72) Inventor: Paul Giura, Cohoes, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 352 days.

(21) Appl. No.: 17/879,584

(22) Filed: Aug. 2, 2022

(65) Prior Publication Data

US 2024/0048971 A1 Feb. 8, 2024

(51) Int. Cl.
*H04W 12/03* (2021.01)
*H04W 4/029* (2018.01)
*H04W 12/02* (2009.01)

(52) U.S. Cl.
CPC ............ *H04W 12/03* (2021.01); *H04W 4/029* (2018.02); *H04W 12/02* (2013.01)

(58) Field of Classification Search
CPC ..... H04W 12/03; H04W 4/029; H04W 12/02; H04W 4/20
USPC ....................................................... 455/456.1
See application file for complete search history.

(56) References Cited

U.S. PATENT DOCUMENTS

| | | | | |
|---|---|---|---|---|
| 2009/0115621 | A1* | 5/2009 | Nguyen | G06Q 30/00 340/686.1 |
| 2012/0173257 | A1* | 7/2012 | Preiss | G06Q 10/06 705/2 |
| 2013/0326629 | A1* | 12/2013 | Trethewey | G06F 21/60 726/26 |
| 2015/0105106 | A1* | 4/2015 | Masterman | H04W 4/029 455/456.3 |
| 2017/0343377 | A1* | 11/2017 | Holden | H04W 4/021 |
| 2021/0297128 | A1* | 9/2021 | Badic | G01S 5/0284 |

* cited by examiner

*Primary Examiner* — Don N Vo
(74) *Attorney, Agent, or Firm* — Guntin & Gust, PLC; Andrew Gust

(57) ABSTRACT

Aspects of the subject disclosure may include, for example, accessing registration information that includes a criterion for allowing receiving notifications based on location information of a communication device, accessing a location request of equipment of a location requestor that includes a notification location, accessing encrypted information representative of identification information, the location information, and time information of the communication device that has been stored in a database where the time information corresponds to the location information, identifying a positive result for the location request, and causing a notification to be provided to the communication device responsive to the positive result, where the notification is associated with the location requestor, and wherein the notification is provided to the communication device without providing the identification information of the communication device to the equipment of the location requestor. Other embodiments are disclosed.

20 Claims, 8 Drawing Sheets

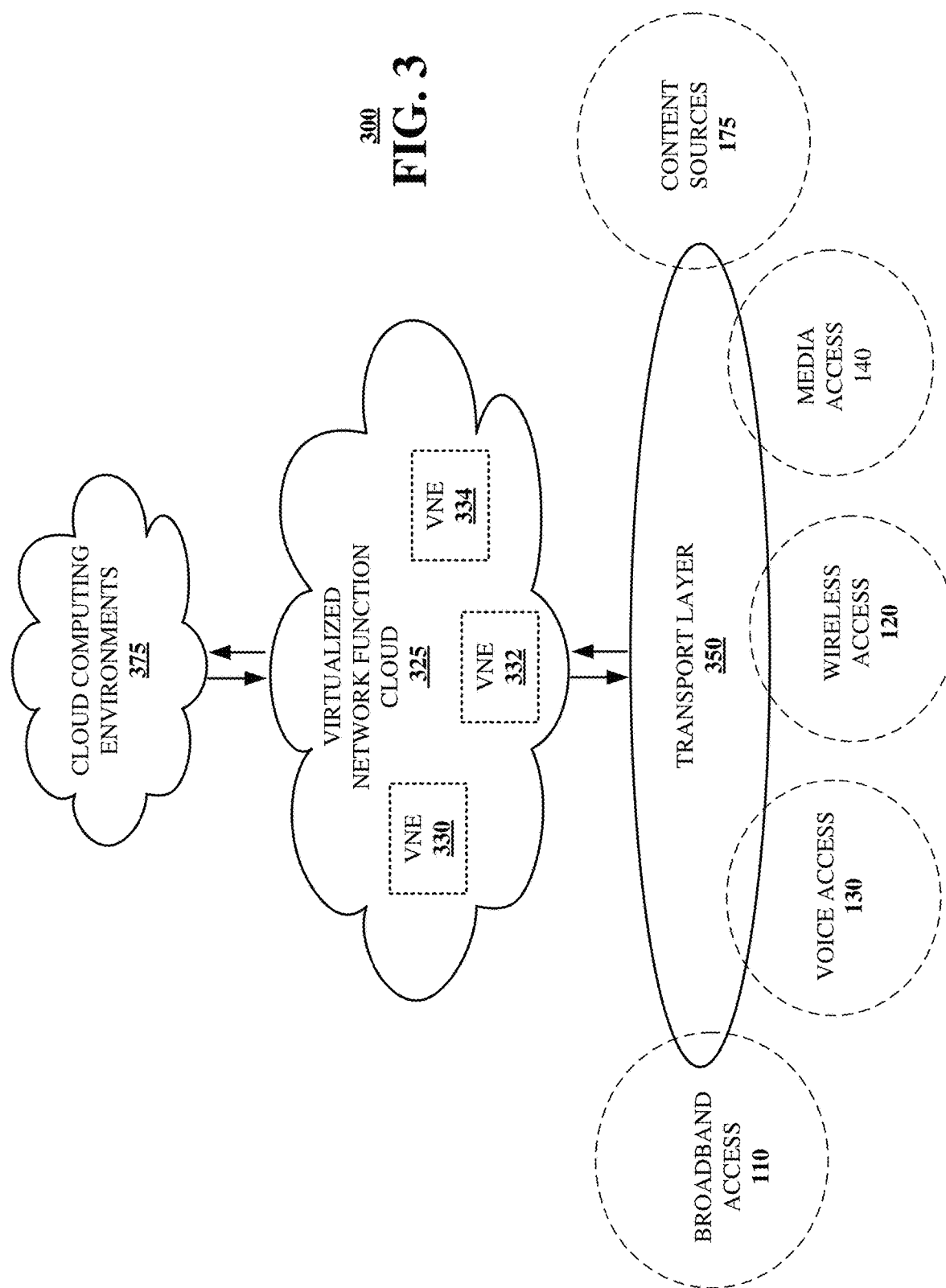

ns include a processor of a communication device,

PRIVACY PRESERVING LOCATION SERVICES

FIELD OF THE DISCLOSURE

The subject disclosure relates to methods and devices that provide privacy preserving location services.

BACKGROUND

Mobile devices, such as smartphones, typically have location detection capabilities. In many cases, the location data can be linked to a specific individual, which can be considered personal data. Many applications using the location data may do so by requesting access to the location records on the device. In some situations, these applications can forward the sensitive location data to other devices, such as third-party remote servers, for processing, which can jeopardize or otherwise put at risk user location privacy. In some instances, the location information is not necessary for the functioning of the application even though access to the location is requested from the device.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
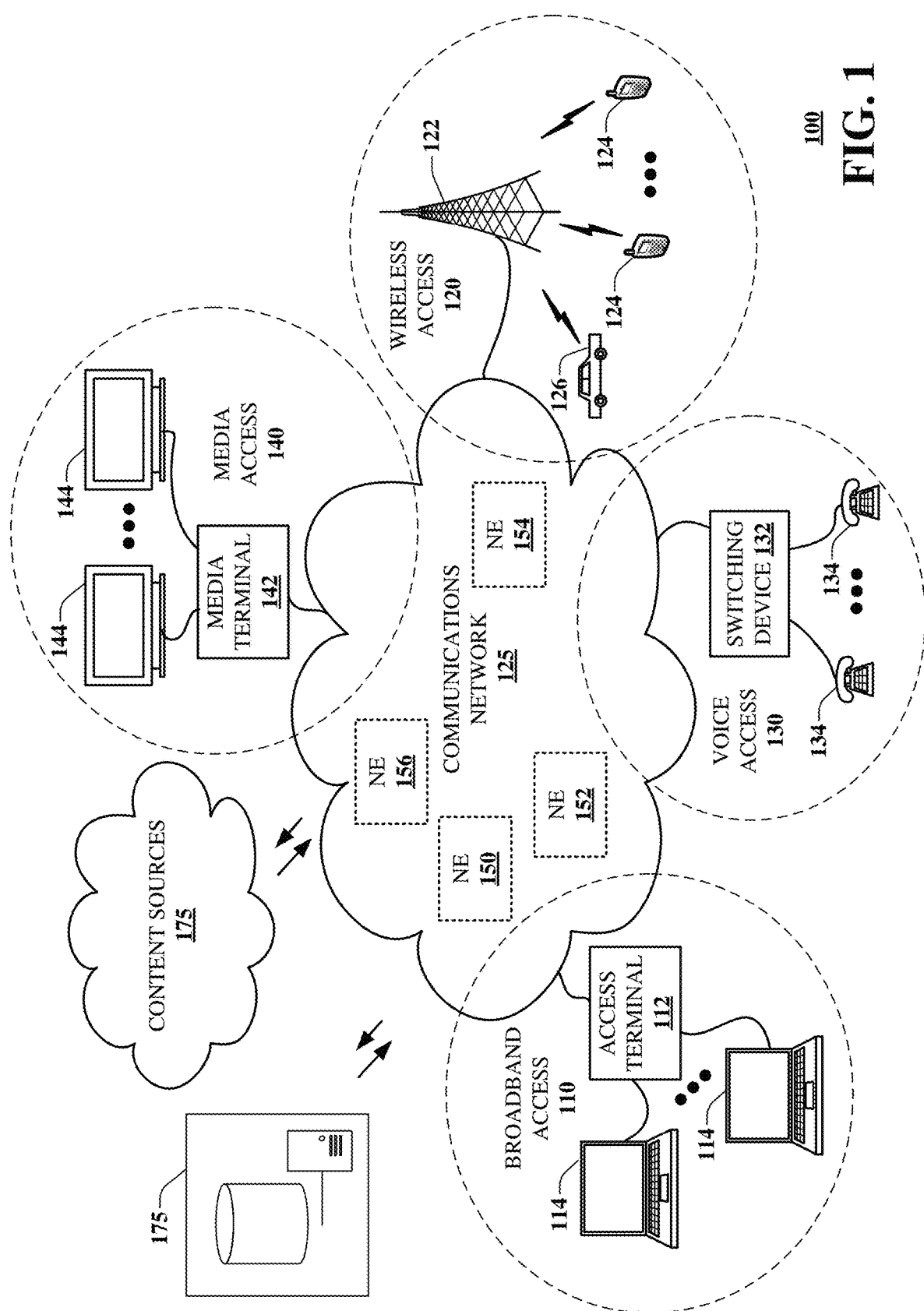
FIG. 1 is a block diagram illustrating an exemplary, non-limiting embodiment of a communications network in accordance with various aspects described herein.

The subject disclosure describes, among other things, illustrative embodiments for providing location services while preserving the privacy of location parameters, such as hiding it or otherwise making it inaccessible to the service provider and/or a third-party requesting location access. In one embodiment, probabilistic data structures, such as Bloom filters, can be utilized to store and query location data while also preventing or denying a third party to access the location data. In one or more embodiments, a scalable method provides location services by preserving the privacy of location parameters, hiding it from both the service provider and the third-party requesting location access. For example, this method can use one-way hash functions and Bloom filters to store and query location data, and does not allow a third party to access location data to link location information to individual devices or users. Other embodiments are described in the subject disclosure.

Devices, such as mobile devices including mobile phones, laptops, IoT devices, vehicle navigation and/or entertainment systems, and so forth, have sensors or other components and/or techniques for determining and collecting device locations at various times. Once the user of a mobile device allows location services to be used by an application, the application may continually use the location information, in many cases sending the information to other external servers, services, or forwarding such information to other interested parties. Applications use the location information for various reasons including displaying advertisements relevant to the user, sending personalized offers while the device is in a location at a particular time or otherwise customizing information that is being sent to the user based on the user's current location. However, for many of these instances there is no need for a third party to collect the location information continuously where it corresponds to particular devices.

To improve security and privacy of users and their devices, one or more embodiments described herein facilitate a location requestor, such as a third party, requesting an intermediary device (e.g., operated by a service provider or other trusted entity) to send a notification to device(s) at a particular location and at or within a particular time which causes the intermediary device to send the notification to only those devices at the location and at or within the time. The notification can be various information including advertisements, SMS messages, offers, and so forth. To improve the efficiency and handling of data, one or more embodiments described herein can utilize encrypted or encoded data transmissions (e.g., hash functions) and/or can utilize predictive data structures, such as Bloom filters, for storing and querying the location data, which as described herein can include locations, identifications, time, authorization criteria, and so forth.

One or more aspects of the subject disclosure is a server including a processing system including a processor; and a memory that stores executable instructions that, when executed by the processing system, facilitate performance of operations. The operations include receiving encrypted information over a network from a communication device, where the encrypted information is representative of identification information and location information of the communication device. The operations include storing, in a database, the encrypted information. The operations include receiving a location request over the network from equipment of a location requestor, where the location request includes a notification location. The operations include identifying a positive result for the location request based on a match of the notification location and the location information of the communication device. The operations include causing a notification to be provided over the network to the communication device responsive to the positive result, where the notification is associated with the location requestor, and where the notification is provided to the communication device without providing the identification information of the communication device to the equipment of the location requestor.

One or more aspects of the subject disclosure include a non-transitory machine-readable medium, comprising executable instructions that, when executed by a processing system including a processor of a communication device, facilitate performance of operations. The operations include providing registration information over a network to a server, where the registration information includes a criterion for allowing receiving notifications based on location information of the communication device. The operations include providing encrypted information over the network to the server, where the encrypted information is representative of identification information and the location information of the communication device. The operations include receiving a notification associated with a location requestor, where the notification is received responsive to a positive result identified by the server, where the positive result is based on satisfying the criterion for allowing receiving notifications based on location information of the communication device and based on a match of the location information of the communication device with a notification location in a location request sent from equipment of the location requestor to the server, where the notification is provided to the communication device without providing the identification information of the communication device to the equipment of the location requestor.

One or more aspects of the subject disclosure is a method including accessing, by a processing system including a processor of a server, registration information of a communication device, where the registration information includes a criterion for allowing receiving notifications based on location information of the communication device. The method includes accessing, by the processing system, a location request of equipment of a location requestor, where the location request includes a notification location. The method includes accessing, by the processing system, encrypted information representative of identification information, the location information, and time information of the communication device that has been stored in a database, where the time information corresponds to the location information. The method includes identifying a positive result for the location request based on a match of the notification location and the location information of the communication device and based on satisfying the criterion for allowing receiving notifications based on location information of the communication device. The method includes causing a notification to be provided to the communication device responsive to the positive result, where the notification is associated with the location requestor, and where the notification is provided to the communication device without providing the identification information of the communication device to the equipment of the location requestor.

Referring now to FIG. 1, a block diagram is shown illustrating an example, non-limiting embodiment of a system 100 in accordance with various aspects described herein. For example, system 100 can include processing devices 175 (e.g., server(s) and database(s)) which facilitate in whole or in part accessing registration information of a communication device which includes a criterion for allowing receiving notifications based on the location information of the communication device, accessing a location request of equipment of a location requestor which includes a notification location, accessing identification information, location information, and time information of the communication device that has been stored in a database where the time information corresponds to the location information, identifying a positive result for the location request based on a match of the notification location and the location information of the communication device and based on satisfying the criterion for allowing receiving notifications based on the location information of the communication device, and causing a notification to be provided to the communication device responsive to the positive result, where the notification is associated with the location requestor, and where the notification is provided to the communication device without providing the identification information of the communication device to the equipment of a location requestor.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
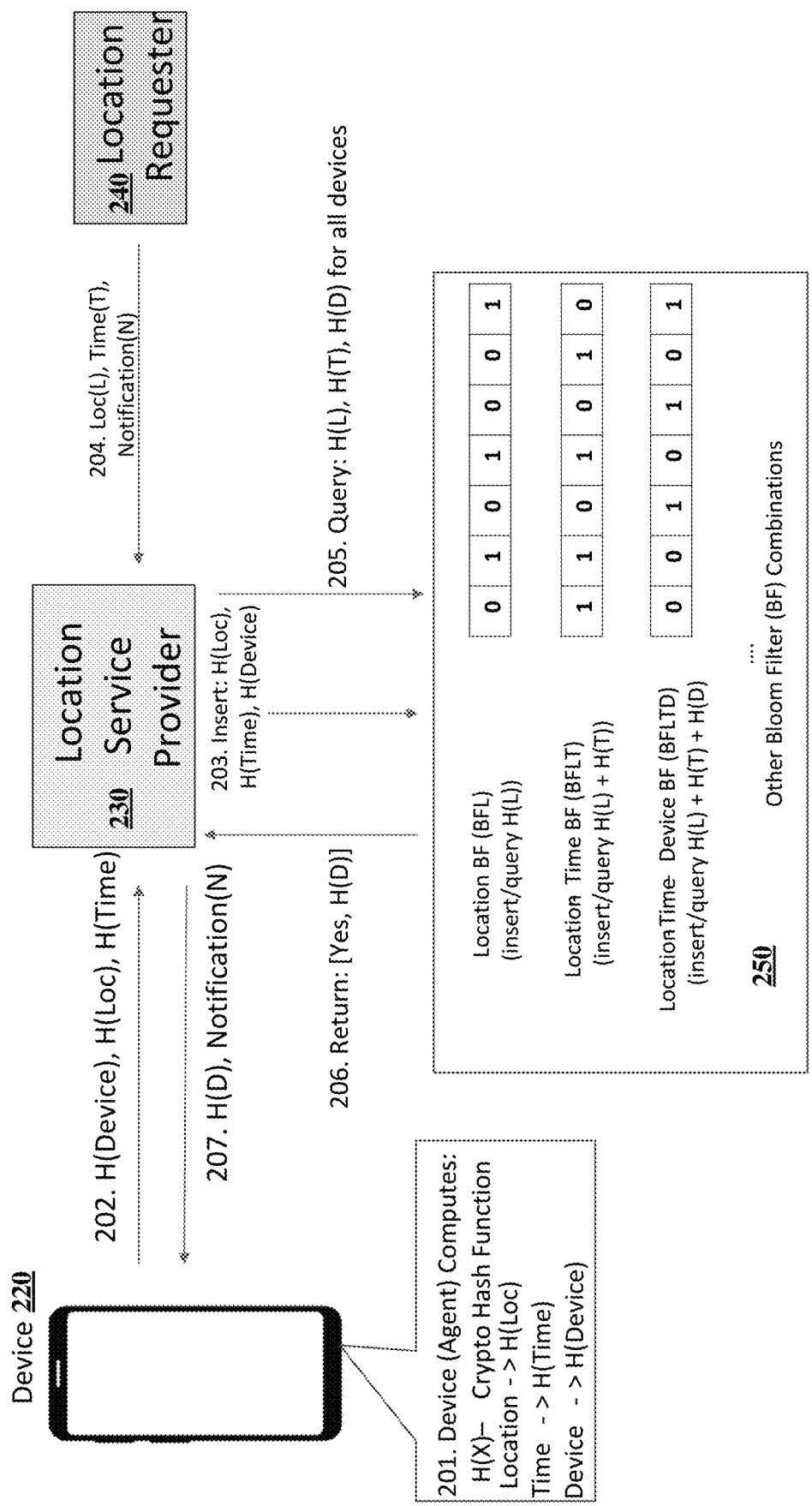
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. System 200 enables a user to activate or otherwise utilize location services on a particular device 220, which is illustrated as a smart phone, but could be other types of devices including laptop computers, IoT devices, vehicle computing systems, other mobile devices, other computing devices (fixed or mobile) that make use of location-based services, and so forth. As an example, the user can opt-in or otherwise engage with a location service provider, which can be various entities including the mobile service provider or another entity (e.g., unrelated to the mobile service provider). At steps 201 and 202, the device 220 (and/or an agent or other software installed on the device) can safely and securely provide encrypted or encoded data representative of location data to the location service provider over a network, such as through use a strong one-way cryptographic hash function (e.g., SHA-256) to encode the sensitive location information (e.g., Device into H(Device) and Location into H(Loc)) which can also include a time interval for which the location is valid (e.g., Time into H(Time)). In one embodiment, time information can be a timestamp with the granularity of second, minute, hour, etc. The encoded information can be sent to the location service provider equipment 230 (e.g., a server or other computing device or virtual machine) to be stored and to enable responding to future notification location queries. At 203, the location information can be added to a database 250 by the server 230, such as a probabilistic data structure. In one embodiment, the hashing by the end user device of information (e.g., location and/or identity information) can prevent a location service provider server from also knowing the actual location and/or the actual identity associated with the end user device even though the location service provider server can insert data into and query the bloom filters. In one embodiment at the time of the query, the location service provider server can process or try out all of the identity hashes in the database and can send the communication to the agent identification that matches the particular hashes. For example, the location service provider server can use the agent on the device to send and receive communications to and from the device such as via the Internet (e.g., IP protocol). In one embodiment, if the location service provider server is operated by the mobile service provider, then the particular server would need to know the location of the device at the granularity of the base station to which the mobile device connects to, in order to provide service. In one embodiment, the Privacy Preserving LSP service can provide privacy for the location data (e.g., GPS coordinates) collected by the device, which is a more exact location as compared with the mobility tower location. In one embodiment, the location information is inserted into Bloom filters (BF), such as one Bloom filter per type of information (e.g., one Bloom filter for location BFL, one Bloom filter for location-time combination BFLT, one Bloom filter for location-time-device combination BFLTD) or other combinations and techniques according to the data and criteria being collected and utilized for location service authorization.

At 204, the location requestor equipment 240 (e.g., an advertising server, a messaging service, a location-based application operating on a server, and so forth) can submit a location (L), time (T), and/or notification (N) to the server 230 to cause or otherwise enable the server 230 to send, or otherwise cause the sending of, the notification to the device(s) that are determined to be associated with the location and time parameters requested, L and T. In one embodiment, the time parameter can be omitted, in which case, the notification would be intended for all the devices in location L regardless of time. At 205, the Bloom filters (or other database structure including probabilistic data structures) can be queried to identify the devices that match location L and/or time T specified by the requestor. To minimize potential false positives occurring by using Bloom filters or other probabilistic data structures, the query strategy can be set to first query the location Bloom filter for L. In the case where L is found in the Bloom filter, then the process can proceed to query the Bloom filter storing location-time for T, and so forth. Other criteria can also be utilized and the insertion and query technique utilizing the Bloom filters (or other database structures) can be applied with these other criteria (e.g., restrictions on providing location information such as designated by the user and/or by another entity).

In one or more embodiments, the utilization of Bloom filters provides efficiency in processing the data such as in the case of a "No" answer to a query, (i.e., the element was not found in the Bloom filter), then it can be guaranteed that location L was never inserted (i.e., there were no devices in location L), therefore the query stops there. For instance, only after all the checks for location and time are passed (i.e., the location and time were found in the corresponding Bloom filters), and/or checks for other criteria requirements, then the Bloom filter containing information about the device (e.g., device identification) can be queried. In one embodiment, to find exactly the devices associated with L and T, one must query for all devices in the list maintained by the location provider server 230. When the location-time-device Bloom filter returns "Yes" for a device then the result is returned in step 206. At step 207, the notification can be delivered by the server 230 (or another device designated by the server such as an ad server) to all devices found to be associated with location L at time T. In one embodiment, the agent on the end user device receiving the notifications can be identified by an ID and an IP address which can be communicated to other parties via appropriate APIs so that notifications can be communicated.

Figure 2B:
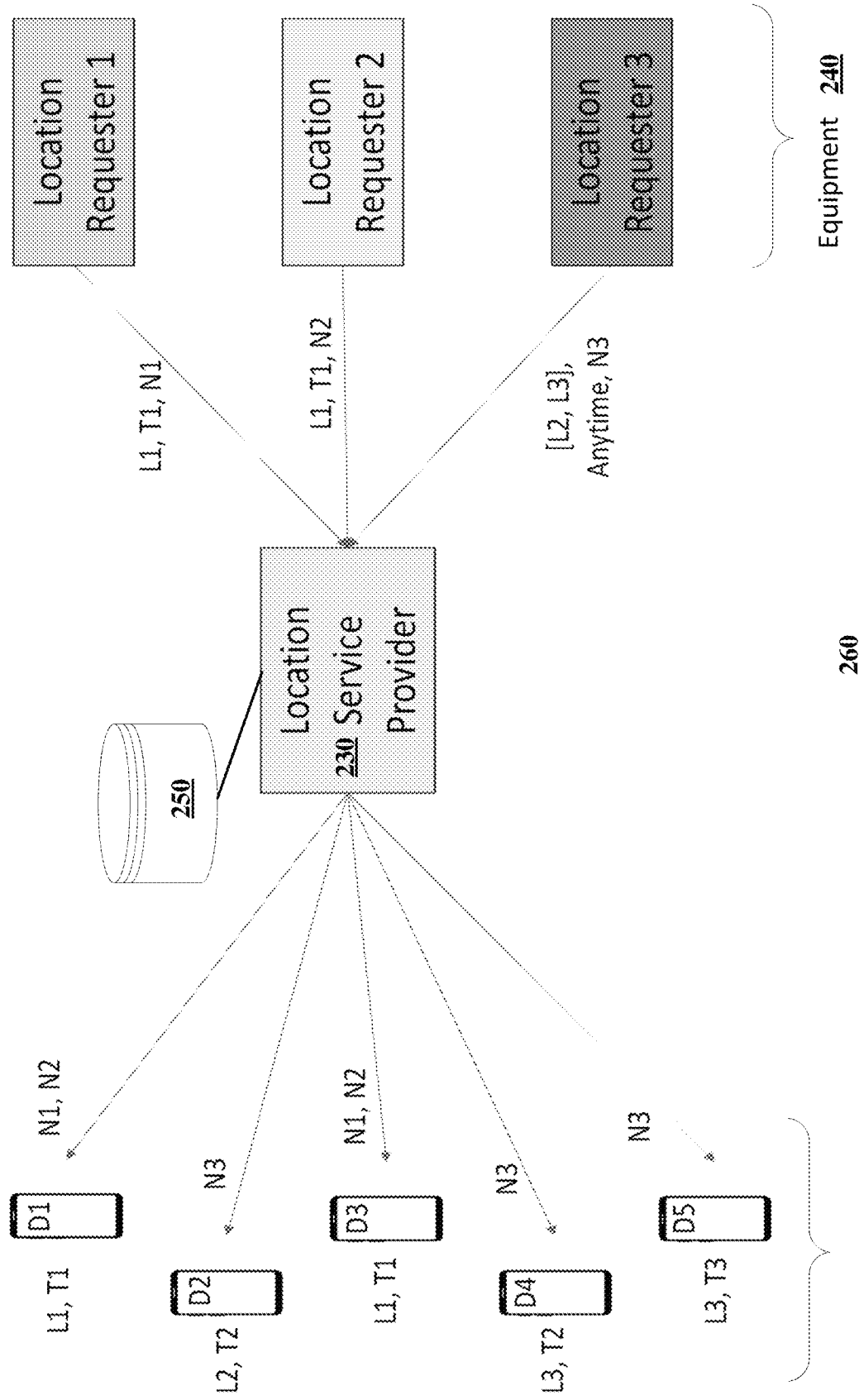
FIG. 2B is a block diagram illustrating an example, non-limiting embodiment of a system functioning within the communication network of FIG. 1 in accordance with various aspects described herein.

FIG. 2B is a block diagram illustrating an example, non-limiting embodiment of a system 260 functioning within the communication network of FIG. 1 in accordance with various aspects described herein. As an example, system 260 can be a multiple location requestor and multiple user scenario which is being handled by a location service provider 230 (e.g., a single provider which can be a mobile provider or a third-party entity). Multiple location requestors 240 can intend to send notifications to multiple devices 220 that are enrolled or otherwise registered with a privacy location service that is being managed or otherwise operated by location service provider server 230. A location requestor device or equipment 240 can choose to send a notification during a particular time (e.g., a store would like to incentivize customers to shop in the morning by sending them coupons at that time) which is represented by location requestors 1 and 2, while in other cases a location requestor device may want to send a notification at any time, on first occurrence of the device in a particular location, which is represented by location requestor 3. The notification to the particular device(s) could be in many forms such as an SMS message, an application notification, a push message on the device, an advertisement, and so forth. System 260 can efficiently and effectively manage location data, particularly where an application indicates that it needs to know your location at all times.

In one or more embodiments, the location service provider can create an opportunity for an entity to safely and securely manage location data for users. In another embodiment, an advertiser or an advertising broker managing location-based services can perform some of the functions described herein such as providing location requests, notifications, timing requirements and so forth to the location service provider while not being provided with the device identification information. In one or more embodiments, the location service provider can perform the query based on other criteria associated with the device and/or the user of the device, such as demographics (e.g., received by the location service provider with the registration information from the user).

As an example, a user can register his or her device(s) with the location service provider including user identity and/or device identity. In one embodiment, a registration process can provide a device identity and other selections from the user device in encoded/hash form so that a location service provider does not know the device identity but can still use it in hash form for insertion and query of bloom filters and transmitting notifications. For example, a device ID can be a unique identifier of an end user device that is not derived directly from an identity of the device, but rather derived from the identity of the device as the output of a hash function with the device identity as input. In one or more embodiments, the device identity can be a collective identity or a category (e.g., licensed doctors, construction workers, contractors, etc.), or can be a unique identity per device.

The registration process can also request other information from the user, such as preferences for authorizing distribution of location data (e.g., particular times of day, particular locations, particular events, and so forth). In one embodiment, the registration process can also obtain (e.g., via a GUI with selections) other information that the user is willing to share as part of the location-based service which may facilitate obtaining a match for the location requestor, such as demographics of the user, authorization to receive particular types of notifications or advertisements, prohibition against receiving particular types of notifications or advertisements, and so forth.

In one embodiment, a user can designate different attributes with respect to revealing or not revealing location data such as not revealing location within a certain time window or at a certain location. In one embodiment, a hash function or a one-way encoding technique can be utilized for mapping input value to output for the sensitive information being provided by the user device. In one embodiment, the device identification can be of various types including mobile number, Electronic Serial Number (ESN), application user-name, and so forth.

For example, the registration information can include preferences such as indicating location and/or time for providing the user's location data to be analyzed for a match with location requestors queries, such as a contractor that goes to the store each morning and enables the service during that time so he or she can receive advertisements associated with the store or a teacher who would like to have location-based information provided to her while she is at school (e.g., a time and/or location of school can be designated). In one or more embodiments, the system 260 can obtain a positive result (e.g., through use of Bloom filters) when there is a match between stored user location and the requested location (and/or other required criteria such as time of day) received from the location requestor.

In one embodiment, when you insert elements into a Bloom filter, bits are flipped. For example, insertions and queries can be applied to the Bloom filters where an empty Bloom filter is a bit array all set to 0, with a number of different hash functions defined (which can depend on an acceptable false error rate) that each maps or hashes some set element to one of the array positions. One process for utilizing Bloom filters includes elements being added by being fed to hash functions to get array positions and these bits can then be set to 1; and to query for an element (i.e., determine if present in the set), the element can be fed to the hash functions to get array positions, and if any of the bits at these positions is 0 then the element is not in the set, while if all are 1 then either the element is in the set, or the bits have by chance been set to 1 during the insertion of other elements, resulting in a false positive.

In one or more embodiments, increasing the amount of storage can lower the false positive rate so that location service provider can provide predictions as to false positive rates for their customers. In one or more embodiments, multi-level Bloom filters provide for efficiency in querying data such that if it is determined that a particular requested location has not been inserted in the Bloom filter then the query can end (without analyzing the next levels of Bloom filters), but the query would continue to the next level (e.g., Location Time Bloom filter) when it is determined that the particular requested location has been inserted in the Bloom filter. The use of Bloom filters also provides for efficiency in scalability where the number of users of the location service increases.

Other techniques can also be utilized to manage the Bloom filters (or other database structures including probabilistic data structures) such as aging schemes or processes. In one embodiment, the Bloom filters can be unique to each device. In another embodiment, a common Bloom filter can be utilized for a group, such as a list of identifications that can be combined via hash functions with values for location and time so that the query is against one common Bloom filter for all users. In one embodiment, hash values can be stored so that whenever a match is detected then the location service provider is able to direct the notification of the location request to that particular user device.

In one embodiment, the notification can be sent via unicast and/or multicast message to a user or group of users. Other techniques for transmitting the messages can be utilized including broadcast.

In one or more embodiments, the system can protect more granular location determinations than mobile service providers obtain since the mobile service provider may be limited to location determination based on tower granularity as opposed to a device location determination which can be more precise. In one or more embodiments, the system can allow advertisers or application developers or other entities to provide a location-based service such as providing notifications to the user device while also preventing the advertisers or application developers or other entities from obtaining location data that can be mapped to a particular user.

Figure 2C:
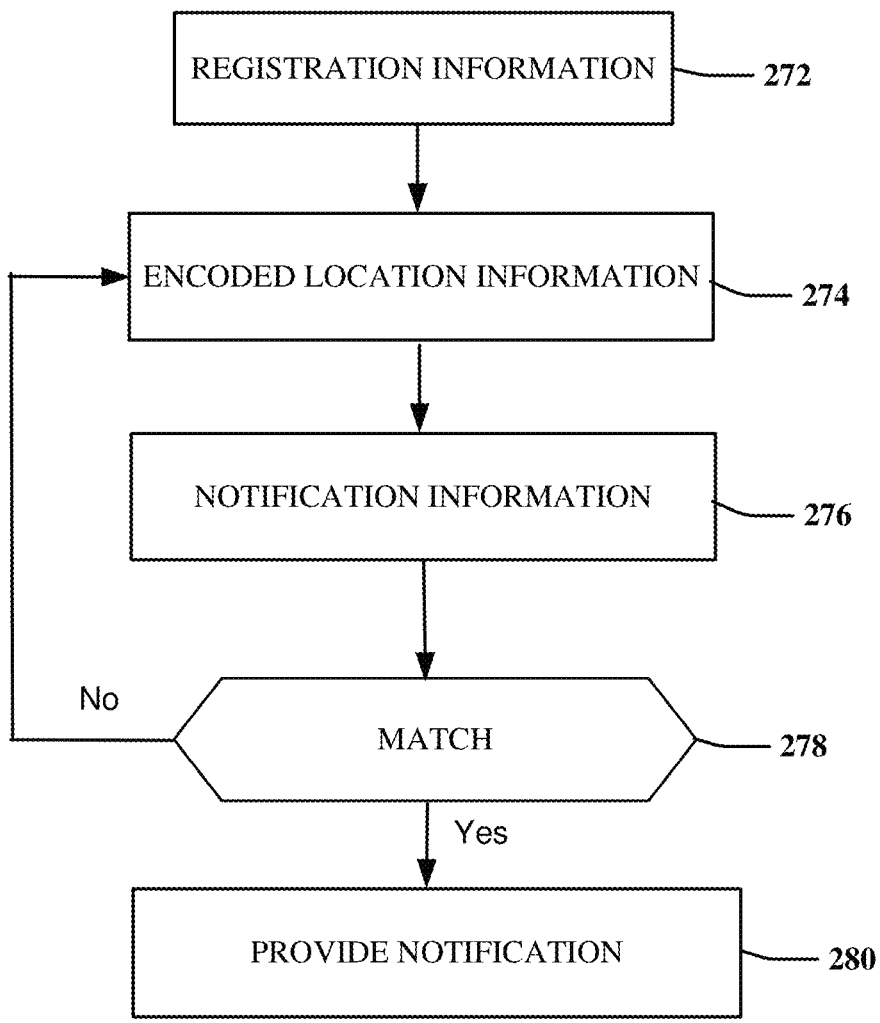
FIG. 2C depicts an illustrative embodiment of a method in accordance with various aspects described herein.

FIG. 2C depicts an illustrative embodiment of a method 270 in accordance with various aspects described herein. The steps or functions described in method 270 can be performed in whole or in part by various devices. At 272, registration information of a communication device can be obtained or otherwise accessed. The communication device can be various types of devices that are capable of utilizing location-based services, including mobile devices, smart phones, laptops, IoT devices, vehicle navigation and/or entertainment systems, and so forth. In one embodiment, the registration information can include one or more criteria for allowing use of the location-based service. For example, a user can register with a location services server by accessing a GUI and making selections as to criteria for allowing third parties to provide notifications that are location-based. Various information can be provided during the registration process including identification information (e.g., device IDs, usernames, etc), location areas where access is permitted and/or not permitted (e.g., work location, stores, school, and so forth), time periods during which access is permitted and/or not permitted (e.g., hours when user is at work or school, and so forth).

At 274, encrypted information from the user device can be obtained or otherwise accessed. The encrypted information can be representative of identification information, location information, and time information of the communication device and can be stored in a database. In one embodiment, the time information corresponds to the capturing of the location information.

At 276, a location request of equipment of a location requestor can be obtained or otherwise accessed. As an example, the location request can include a notification location and/or a time period for providing the notification (e.g., within 5 minutes of the device being present at the requested location).

At 278, the database can be queried based upon the received location request identify a positive result for the location request based on a match of the notification location and the location information of the communication device. In one embodiment, this positive result can further be based on satisfying one or more other criteria (e.g., designated by the user such as during registration) including the criterion for allowing receiving location-based notifications at the communication device.

At 280, if there is a match then a notification can be provided to the communication device. For instance, the notification can be associated with the location requestor, and the notification can be provided to the communication device without providing the identification information of the communication device to the equipment of the location requestor. In one embodiment, the notification can be an SMS message, an advertisement, an application notification, or a combination thereof, where the identifying the positive result utilizes Bloom filters that are arranged in a multi-level structure based on types of data, and where the multi-level structure of the Bloom filters comprises a first level based on location data, a second level based on time data, and a third level based on identification data.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

The embodiments described herein have several benefits. For example, a privacy preserving method is implemented to enable location services for customers and third parties facilitated by the location service provider. In one embodiment, the location parameters (e.g., in a readable form) may never leave the device where they were collected and may not be known by the location requestor and/or the service provider. In another embodiment, the service provider may not disclose the individual mapping between the location and the device. In another embodiment, an opportunity is provided for service providers (e.g., mobile carriers) to offer privacy preserving location services which uses mathematical constructs such as one-way cryptographic hash functions and Bloom filters to offer privacy guarantees and efficiency. In another example, the efficient nature of the data structures used (e.g., Bloom filters) or other predictive data structures, provides for scalability to many users and many location-requestors.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 230 presented in FIGS. 1, 2A, 2B, 2C, and 3. For example, virtualized communication network 300 can facilitate in whole or in part accessing registration information of a communication device which includes a criterion for allowing receiving notifications based on the location information of the communication device, accessing a location request of equipment of a location requestor which includes a notification location, accessing identification information, location information, and time information of the communication device that has been stored in a database where the time information corresponds to the location information, identifying a positive result for the location request based on a match of the notification location and the location information of the communication device and based on satisfying the criterion for allowing receiving notifications based on the location information of the communication device, and causing a notification to be provided to the communication device responsive to the positive result, where the notification is associated with the location requestor, and where the notification is provided to the communication device without providing the identification information of the communication device to the equipment of a location requestor.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
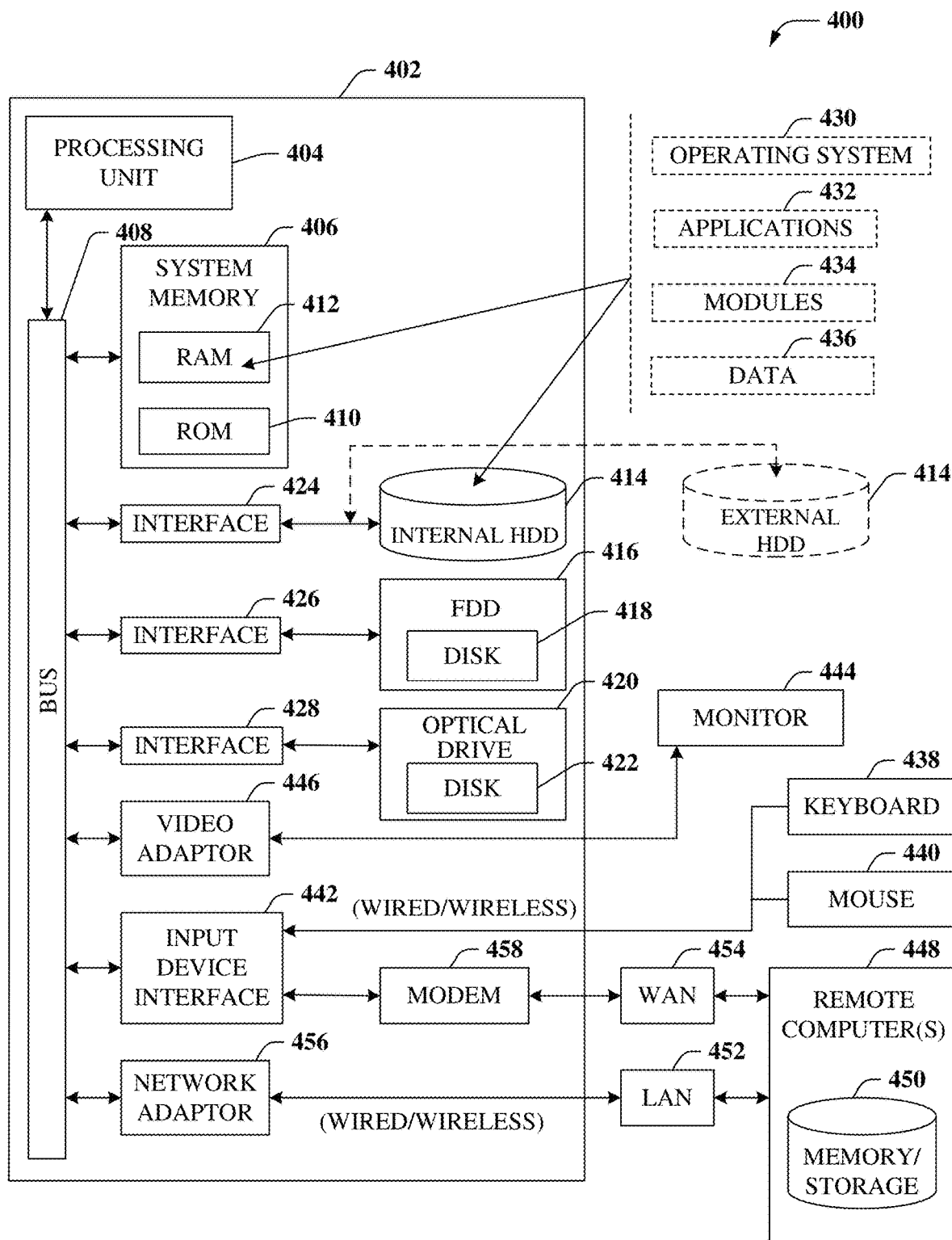
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part accessing registration information of a communication device which includes a criterion for allowing receiving notifications based on the location information of the communication device, accessing a location request of equipment of a location requestor which includes a notification location, accessing identification information, location information, and time information of the communication device that has been stored in a database where the time information corresponds to the location information, identifying a positive result for the location request based on a match of the notification location and the location information of the communication device and based on satisfying the criterion for allowing receiving notifications based on the location information of the communication device, and causing a notification to be provided to the communication device responsive to the positive result, where the notification is associated with the location requestor, and where the notification is provided to the communication device without providing the identification information of the communication device to the equipment of a location requestor.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
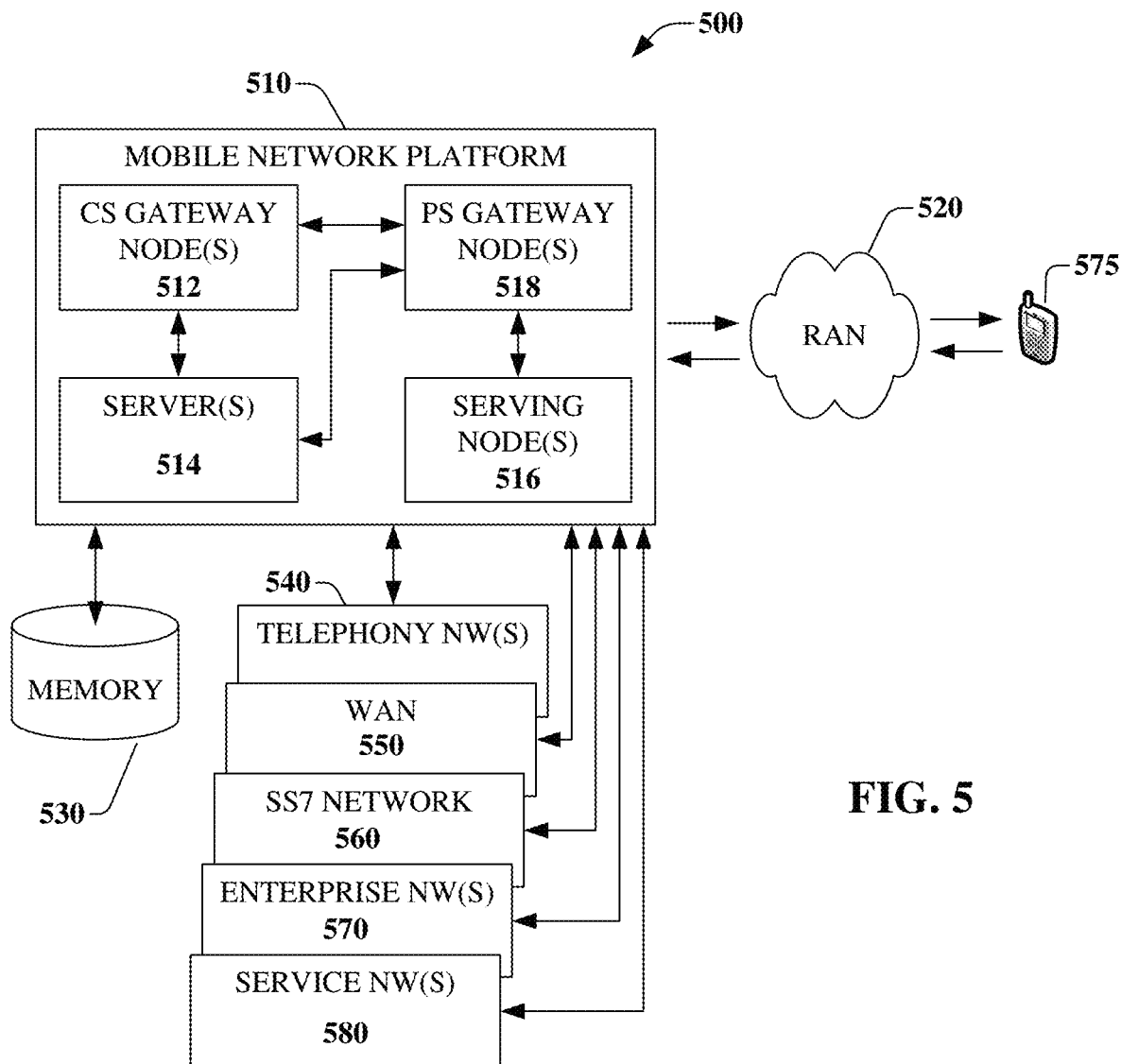
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part accessing registration information of a communication device which includes a criterion for allowing receiving notifications based on the location information of the communication device, accessing a location request of equipment of a location requestor which includes a notification location, accessing identification information, location information, and time information of the communication device that has been stored in a database where the time information corresponds to the location information, identifying a positive result for the location request based on a match of the notification location and the location information of the communication device and based on satisfying the criterion for allowing receiving notifications based on the location information of the communication device, and causing a notification to be provided to the communication device responsive to the positive result, where the notification is associated with the location requestor, and where the notification is provided to the communication device without providing the identification information of the communication device to the equipment of a location requestor. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
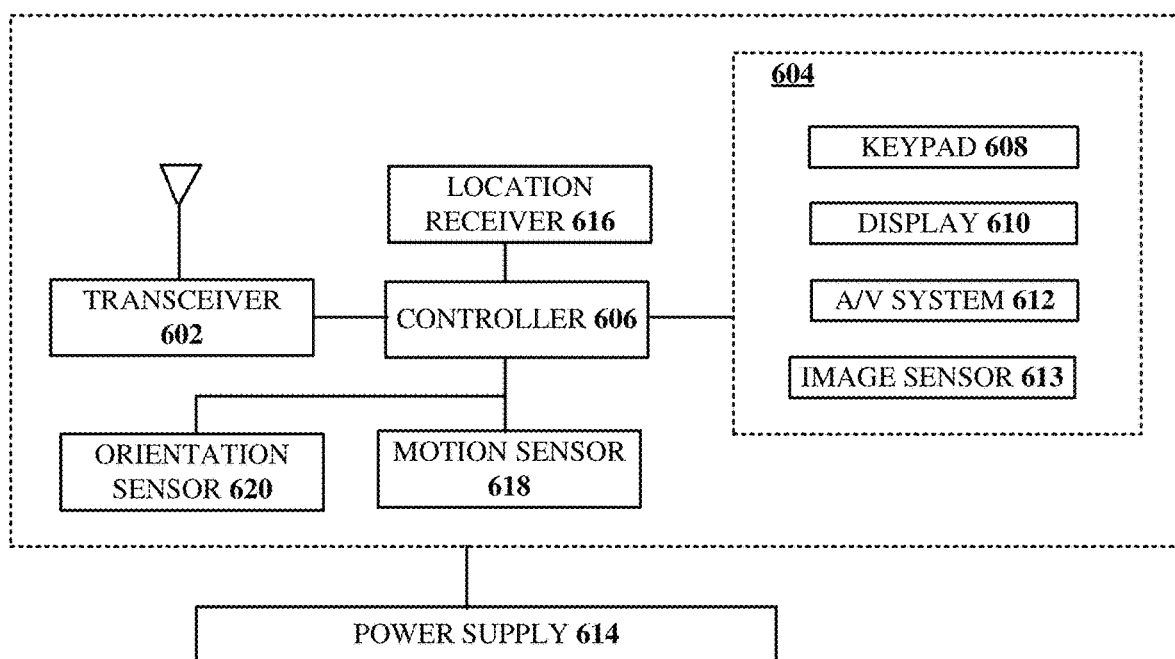
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part accessing registration information of a communication device which includes a criterion for allowing receiving notifications based on the location information of the communication device, accessing a location request of equipment of a location requestor which includes a notification location, accessing identification information, location information, and time information of the communication device that has been stored in a database where the time information corresponds to the location information, identifying a positive result for the location request based on a match of the notification location and the location information of the communication device and based on satisfying the criterion for allowing receiving notifications based on the location information of the communication device, and causing a notification to be provided to the communication device responsive to the positive result, where the notification is associated with the location requestor, and where the notification is provided to the communication device without providing the identification information of the communication device to the equipment of a location requestor.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A server, comprising:
   a processing system including a processor; and
   a memory that stores executable instructions that, when executed by the processing system, facilitate performance of operations, the operations comprising:

receiving encrypted information over a network from a communication device, wherein the encrypted information is representative of identification information and location information of the communication device;

storing, in a database, the encrypted information;

receiving a location request over the network from equipment of a location requestor, wherein the location request includes a notification location;

identifying a positive result for the location request based on a match of the notification location and the location information of the communication device; and causing a notification to be provided over the network to the communication device responsive to the positive result, wherein the notification is associated with the location requestor, and wherein the notification is provided to the communication device without providing the identification information of the communication device to the equipment of the location requestor.

2. The server of claim 1, wherein the encrypted information includes time information associated with the location information of the communication device, wherein the identifying the positive result for the location request is based in part on an analysis of the time information, and wherein the identifying the positive result for the location request comprises utilizing probabilistic data structures of the database.

3. The server of claim 2, wherein the probabilistic data structures of the database comprise Bloom filters that are arranged in a multi-level structure based on types of data in the encrypted information and in the location request.

4. The server of claim 3, wherein the multi-level structure of the Bloom filters comprises a first level based on location data, a second level based on time data, and a third level based on identification data.

5. The server of claim 1, wherein the causing the notification to be provided to the communication device comprises receiving the notification from the equipment of the location requestor and transmitting the notification to the communication device.

6. The server of claim 1, wherein the operations further comprise receiving registration information over the network from the communication device, wherein the registration information includes a criterion for allowing receiving notifications based on the location information of the communication device, wherein the identifying the positive result for the location request is based in part on satisfying the criterion for allowing receiving notifications based on the location information of the communication device.

7. The server of claim 6, wherein the criterion comprises a time period, a geographical area, or a combination thereof.

8. The server of claim 1, wherein the encrypted information from the communication device comprises cryptographic hash functions representative of the identification and location information of the communication device and time information corresponding to the location information.

9. The server of claim 1, wherein the notification comprises an SMS message, an advertisement, an application notification, or a combination thereof.

10. The server of claim 1, wherein the notification is an advertisement.

11. The server of claim 10, wherein the advertisement is sourced by an advertisement server that is different from the equipment of the location requestor.

12. A non-transitory machine-readable medium, comprising executable instructions that, when executed by a processing system including a processor of a communication device, facilitate performance of operations, the operations comprising:

providing registration information over a network to a server, wherein the registration information includes a criterion for allowing receiving notifications based on location information of the communication device;

providing encrypted information over the network to the server, wherein the encrypted information is representative of identification information and the location information of the communication device; and receiving a notification associated with a location requestor, wherein the notification is received responsive to a positive result identified by the server, wherein the positive result is based on satisfying the criterion for allowing receiving notifications based on location information of the communication device and based on a match of the location information of the communication device with a notification location in a location request sent from equipment of the location requestor to the server, wherein the notification is provided to the communication device without providing the identification information of the communication device to the equipment of the location requestor.

13. The non-transitory machine-readable medium of claim 12, wherein the providing the registration information over the network to the server comprises:

accessing a registration graphical user interface; and selecting criteria including the criterion for allowing receiving notifications based on location information of the communication device, wherein the criteria include a time period, a geographical area, or a combination thereof.

14. The non-transitory machine-readable medium of claim 12, wherein the encrypted information comprises cryptographic hash functions representative of the identification and location information of the communication device and time information corresponding to the location information.

15. The non-transitory machine-readable medium of claim 12, wherein the notification comprises an SMS message, an advertisement, an application notification, or a combination thereof.

16. The non-transitory machine-readable medium of claim 12, wherein the encrypted information includes time information associated with the location information of the communication device, wherein the positive result is based in part on an analysis of the time information by the server, wherein the positive result is identified by the server utilizing Bloom filters that are arranged in a multi-level structure based on types of data.

17. The non-transitory machine-readable medium of claim 16, wherein the multi-level structure of the Bloom filters comprises a first level based on location data, a second level based on time data, and a third level based on identification data.

18. A method, comprising:

accessing, by a processing system including a processor of a server, registration information of a communication device, wherein the registration information includes a criterion for allowing receiving notifications based on location information of the communication device;

accessing, by the processing system, a location request of equipment of a location requestor, wherein the location request includes a notification location;

accessing, by the processing system, encrypted information representative of identification information, the location information, and time information of the communication device that has been stored in a database, wherein the time information corresponds to the location information;

identifying a positive result for the location request based on a match of the notification location and the location information of the communication device and based on satisfying the criterion for allowing receiving notifications based on location information of the communication device; and causing a notification to be provided to the communication device responsive to the positive result, wherein the notification is associated with the location requestor, and wherein the notification is provided to the communication device without providing the identification information of the communication device to the equipment of the location requestor.

19. The method of claim 18, further comprising:
receiving, by the processing system, the registration information over a network from the communication device;
receiving, by the processing system, the location request over the network from the equipment of the location requestor; and
receiving, by the processing system, the encrypted information over the network from the communication device.

20. The method of claim 18, wherein the notification comprises an SMS message, an advertisement, an application notification, or a combination thereof, wherein the identifying the positive result utilizes Bloom filters that are arranged in a multi-level structure based on types of data, and wherein the multi-level structure of the Bloom filters comprises a first level based on location data, a second level based on time data, and a third level based on identification data.

* * * * *